INVENTOR
James A. Gatlin
BY
Carl Levy
ATTORNEYS

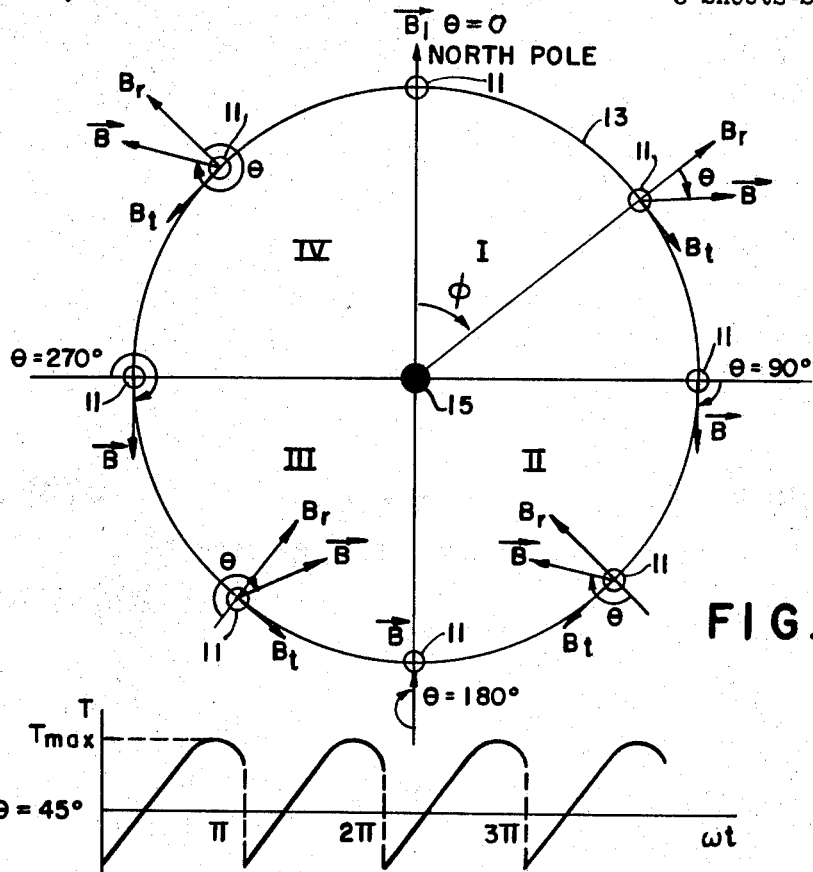
FIG.1.
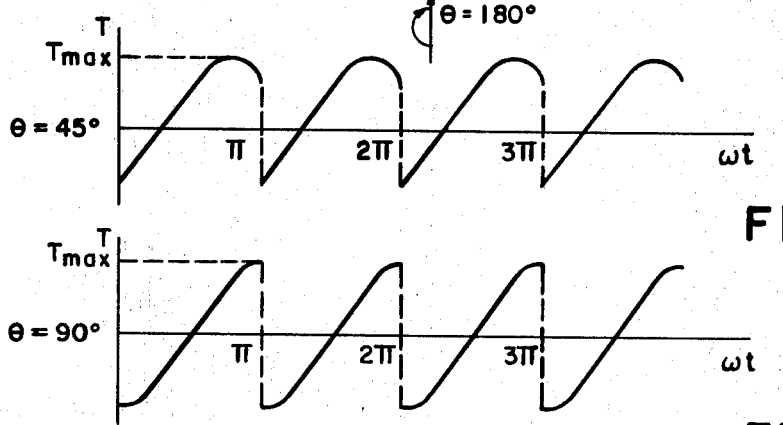
FIG.2A.
FIG.2B.
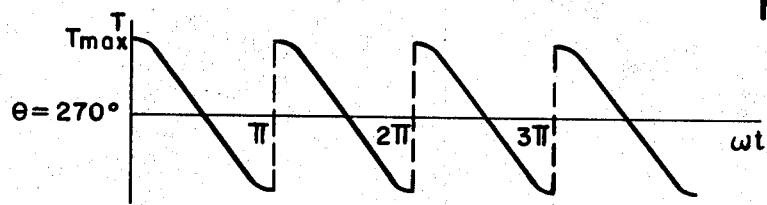
FIG.2C.
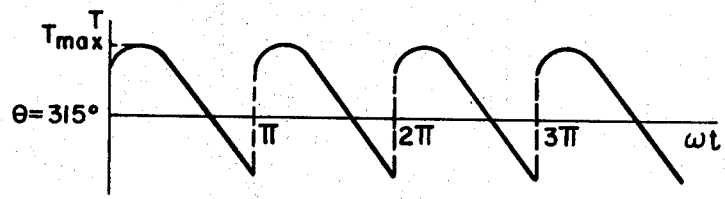
FIG.2D.
INVENTOR
James A. Gatlin Oct. 20, 1970   J. A. GATLIN   3,534,925
CARTWHEEL SATELLITE SYNCHRONIZATION SYSTEM
Filed April 9, 1968   3 Sheets-Sheet 2

INVENTOR
James A. Gatlin
ATTORNEYS 3,534,925
CARTWHEEL SATELLITE SYNCHRONIZATION SYSTEM
James A. Gatlin, Bowie, Md., assignor to the United States of America as represented by the Administrator of the National Aeronautics and Space Administration
Filed Apr. 9, 1968, Ser. No. 719,869
Int. Cl. B64g 1/00
U.S. Cl. 244—1        9 Claims

ABSTRACT OF THE DISCLOSURE

The disclosure describes a method and apparatus for the spin phase synchronization of a cartwheel satellite in a polar orbit. The method comprises the steps of: sensing the spin rate of the satellite; comparing the spin rate of the satellite with a reference spin rate, and changing the spin rate of the satellite so that the actual spin rate concides with a reference spin rate. An additional step of commutating a torquing coil is also proved. The apparatus includes a sensor means located on the satellite for sensing the spin rate of the satellite and for generating a signal related to said satellite spin rate. A comparison means compares the spin rate signal with a reference spin rate signal and generates an error signal related to the phase difference between the two spin rate signals. The error signal is used to control the application of energy to a torquing coil mounted on the satellite. In addition, the energy is commutated by a programmer means in accordance with the atitude of the satellite and the satellite's position in the polar orbit prior to its application to the torquing coils. The magnetic field generated by the torquing coils interact with the earth's magnetic field to vary the spin rate of the satellite so that the satellite spin rate can be increased or decreased.

The invention described herein was made by an employee of the United States Government and may be manufactured and used by or for the Government for governmental purposes without the payment of any royalties thereon or therefor.

BACKGROUND OF THE INVENTION

One type of satellite developed by the National Aeronautics and Space Administration is the Tiros weather satellite. The operational model of this satellite, Tiros Operational Satellite (TOS), operates in a cartwheel mode. That is, the satellite has a cartwheel configuration and spins about an axis that projects through its center in the manner of a wheel spinning on a shaft. Spinning the satellite in this maner, improves its stability so that the satellite can clearly and accurately photograph the earth's weather map as seen from the satellite's orbit. Specifically, a plurality of cameras point outwardly from the axis of the TOS. And, as the TOS spins, each camera in turn points downwardly toward thhe earth. When a camera is pointing downwardly, it is triggered to take pictures of the earth's weather map. Further, when one camera passes through the horizon from earth to space, a second camera passes through the other horizon from space to earth, so that a continuous picture of the earth's weather map can be taken.

One of the problems with the TOS system has been the synchronization of camera photography with satellite spin rate. That is, it is essential to the successful operation of the system that the camera be triggered to take photographs when the camera is pointed towards the earth, not when the camera is pointed towards space. More specifically, because the cameras are spinning with the TOS, their triggering must be synchronized with the rate of spin so that pictures are taken when the cameras are pointed toward the earth.

The prior art systems for synchronizing the TOS are open loop system. Essentially, a horizon sensor located on board the satellite sends signals to a ground station when the sensor senses the horizon. The ground station processes these horizon signals and sends periodic "spin-up" or "spin-down" signals to the satellite. These spin-up or spin-down signals are utilized by the satellite to control the application of power to torquing coils located on the satellite. The torquing coils generate magnetic fields that interact with the earth's magnetic field to spin-up or spin-down the satellite as required. In addition to the disadvantage of requiring complex electronic equipment for the transmission of signals to a ground station for processing and the retransmission of signals to the satellite for control, the system has the disadvantage that there can be up to a 6 second uncertainty as to when a picture will be taken. Hence, it is desirable to provide a synchronization system that is less complicated than the prior art system and also eliminates the uncertainty as to when a picture will be taken.

The prior art systems have a further disadvantage. Specifically, the prior art has recognized that it is necessary to commutate the application of power to the torquing coils of the satellite so that an average torque will occur over a complete revolution of the satellite about it's axis. The prior art has used a commutation method wherein the power is commutated once during each cycle of the satellite about its axis. That is, the direction of the application of power is reversed once each cycle. The usual point of reversal has been 180° after a predetermined point on the satellite has passed through the local vertical. This method of commutation has several disadvantages. The primary disadvantage is that the average torque equal zero when the satellite is in certain orbital positions. Hence, when the satellite is in certain positions, it cannot be spun-up or spun-down.

Therefore, it is an object of this invention to provide a new and improved method of synchronizing a spin-stabilized satellite.

It is also an object of this invention to provide a new and improved apparatus for synchronizing a spin-stabilized satellite.

It is a further object of this invention to provide an uncomplicated method of commutating the application of power to the spin torquing coil of a spin-stabilized satellite.

In is another object of this invention to provide an uncomplicated apparatus for commutating the application of power to the spin torquing coil of a spin-stabilized satellite.

It is a further object of this invention to provide a new and improved apparatus for synchronizing a spin-stabilized cartwheel satellite that is located entirely on-board the satellite.

SUMMARY OF THE INVENTION

In accordance with a principle of this invention a method of spin phase synchronizing a cartwheel satellite is provided. The method comprises the steps of: sensing the spin rate of the satellite, comparing the satellite spin rate with a reference spin rate to generate a spin phase error and changing the spin rate of the satellite so that the actual spin rate of the satellite coincides with the reference spin rate.

In accordance with another principle of this invention the spin rate is changed by varying the power applied to magnetic torquers located on the space craft so that the spin rate can be increased or decreased.

In accordance with still another principle of the invention the method includes the step of commutating the power applied to the magnetic torquers so that the torque occurs whenever there is a phase difference between the satellite spin rate and the reference spin rate regardless of the location of the satellite in its orbit.

In accordance with a further principle of the invention an apparatus for spin phase synchronizing a cartwheel satellite is provided. The apparatus comprises a sensor means located on the satellite for sensing a spin rate of the satellite and for generating a signal related to the spin rate of the satellite, and a signal means for generating a spin rate reference signal. The apparatus also comprises a comparator means for comparing the satellite spin rate signal with the spin rate reference signal. The comparator means generates an error signal related to the phase difference between the actual spin rate signal and the reference spin rate signal. The error signal is used through approprate electronic means to control the application of energy to a torquing coil mounted on the satellite. In this manner, the spin rate of the satellite can be varied due to the interaction between the magnetic fields of the torquing coils and the earth's magnetic field.

In accordance with a still further principle of the invention the sensor means is a horizon sensor that generates a pulse when it senses the horizon and the signal means generates reference pulses. The horizon sensor pulse is compared with reference pulses in a digital comparator means. And, the digital comparator means generates a phase error signal that is utilized to control the application of power to the magnetic torquing coils.

In accordance with yet another principle of the invention a commutation programmer is connected to the torquing coils so that the application of power to the torquing coils is commutated in such a manner that torque is applied when required regardless of the position of the satellite in its orbit.

In accordance with yet a further principle of the invention the commutation sequence starting from a predetermined point through a complete cycle is: (1) power on; (2) power off; (3) power on reversed (commutated); and, (4) power off.

It will be appreciated by those skilled in the art and others that the invention is an uncomplicated method and an equally uncomplicated apparatus for controlling the synchronization of a cartwheel satellite. All that is required in a sensor means for sensing the rotation of the space vehicle and a comparison means for comparing the rotation with a desired rate of rotation. An error signal generated by the comparison means is utilized to increase or decrease the application of power to magnetic torquing means which interact with the earth's magnetic field. The increase or decrease of power "spins-up" or "spins-down" the space vehicle. In addition, the power is commuated so that a control torque is available regardless of the location of the satellite in its orbit.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a diagram illustrating the orbit of a cartwheel satellite;

FIGS. 2A–D are wave form diagrams illustrating the torque created by the satellite's torquing coils, when commutated by prior art synchronization systems;

DESCRIPTION OF THE PREFERRED EMBODIMENT

Figure 3A:
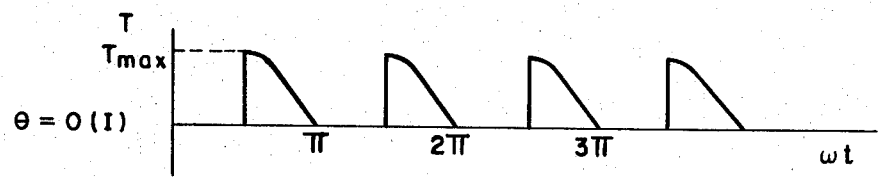
FIGS. 3A–G are wave form diagrams illustrating the torque created by the satellite's torquing coils when commutated in accordance with the present invention.

FIG. 1 is a diagram illustrating a cartwheel satellite 11 in a polar orbit 13 about the earth 15. For purposes of clarity, the satellite 11 is illustrated as large with respect to the earth 15. The earth 15 as illustraetd in FIG. 1 is considered to be a magnetic dipole with lines of magnetic force (not shown) extending from the magnetic north pole to the magnetic south pole. Also for purposes of description and ease of discussion. FIG. 1 neglects the offset between the magnetic and the geographic poles and assumes a true polar orbit with the north pole located at the top of the diagram.

The diagram illustrated in FIG. 1 is broken into four quadrants designated I, II, III and IV. The satellite 11 is assumed to move in a clockwise direction around the earth 15. The angle between the satellite and the north pole is designated $\phi$ while the angle between the magnetic flux density $\vec{B}$ and the local "up" vertical flux density $B_r$ is designated $\theta$. The local tangent flux density is designated $B_t$.

Assuming that a current coil is placed in the cartwheel satellite 11 with a normal to the coil $\vec{M}$ located in the orbit plane, spin torque is produced by the coaction between the magnetic field generated by the coil and the earth's magnetic field. The spin torque T is expressed by the vector equation $\vec{T}=\vec{M}\times\vec{B}$. Since the current coil is spinning at the spin rate of the satellite, the current must be commutated (reversed) once each spin period in order to produce a net average torque per spin. If commutation is not provided, the net average torque per spin always equals zero.

Prior art spin synchronization methods and apparatus provide commutation each time $\vec{M}$ coincides with the local "up" vertical $B_r$. The torque wave shape patterns for a satellite utilizing the prior art synchronization systems for certain orbital points are illustrated in FIGS. 2A–D. Specifically, FIG. 2A illustrates the torque wave shape pattern when $\theta$ equals 45°; FIG. 2B illustrates the torque wave shape pattern when $\theta$ equals 90°; FIG. 2C illustrates the torque wave shape pattern when $\theta$ equals 270°; and FIG. 2D illustrates the torque wave shape pattern when $\theta$ equals 315°. Hence, FIGS. 2A and 2B illustrate the torque wave shape pattern in quadrant I and FIGS. 2C and 2D illustrate the torque wave shape pattern in quadrant IV. Quadrants II and III have torque wave shape patterns that are essentially the same as quadrants I and IV respectively with the positive sense of the current coil being reversed, hence, these torque wave shape patterns are not illustrated.

From viewing FIGS. 2A–D it will be apparent to those skilled in the art that the average torque per spin using the prior art commutation systems is zero at certain satellite locations. That is, for a commutation system that provides torque for the complete spin and one reversal per spin period, the average torque at certain satellite orbital locations is zero. Specifically, FIGS. 2B and 2C illustrate orbital positions for a system with a reversal at the local up vertical that have an average torque equal to zero. Hence, when a satellite, using a prior art commutation system, is in a $\phi=90°$ or a $\phi=270°$ position no average net torque is applied to the satellite because over a spin period the average net torque is zero.

As hereinafter described, this invention eliminated periods when the net torque between the magnetic field of the satellite's current coil and the earth's magnetic field equals zero by commutating the current in a different manner. Specifically, this invention applies current to the coil in the following sequence: on a quarter spin; off for a quarter spin; commutated and on for a quarter spin; and, off for the final quarter spin. In addition, the point of starting the foregoing sequence varies between quadrants. Preferably, the local vertical ($B_r$) determines the point of commutation in quadrants II and IV while the local tangent ($B_t$) occurring a quarter spin after the local vertical, is the commutation point when the satellite is in quadrants I and III. It will be appreciated by those skilled in the art that, as with the prior art commutation systems, the positive sense of the coil current is reversed for orbital quadrants II and III, and I and IV, respectively.

Figure 3B:
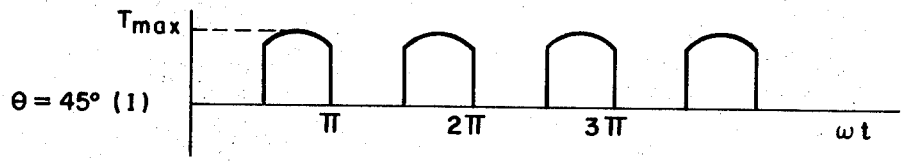
Figure 3C:
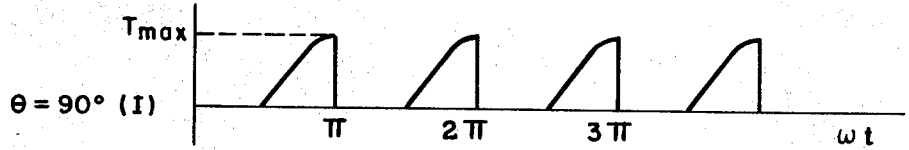
Figure 3D:
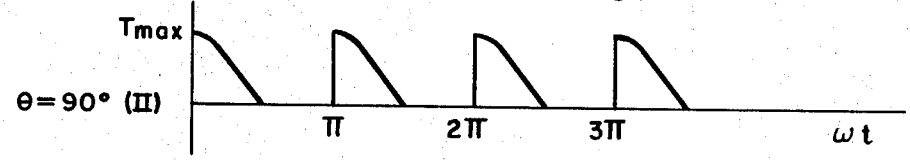

FIGS. 3A–G are torque wave shape patterns that illustrate the average torque generated utilizing the commutation sequence of the invention at certain points in the orbit of the satellite. Specifically, FIG. 3A illustrates the average torque generated when $\theta$ equals 0°; FIG. 3B illustrates the average torque generated when $\theta$ equals 45°; and FIG. 3C illustrates the average torque generated when $\theta$ equals 90°; FIG. 3D also illustrates the average torque generated when $\theta$ equals 90°. The difference between FIGS. 3C and 3D is that FIG. 3C is at the trailing edge of quadrant I whereas FIG. 3D is at the leading edge of quadrant II. More specifically, the difference between FIG. 3C and FIG. 3D is caused by the reversal of the positive sense of the coil current referred to above.

Figure 3E:
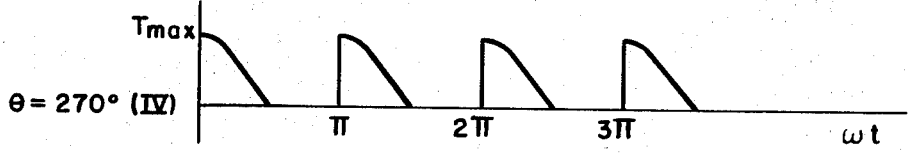
Figure 3F:
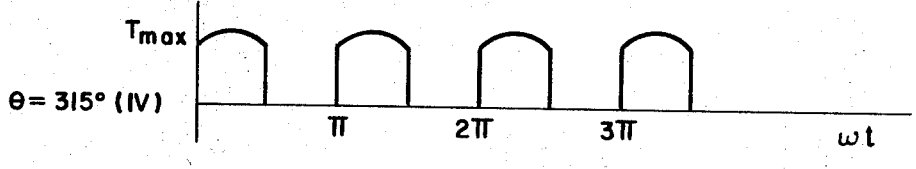
Figure 3G:
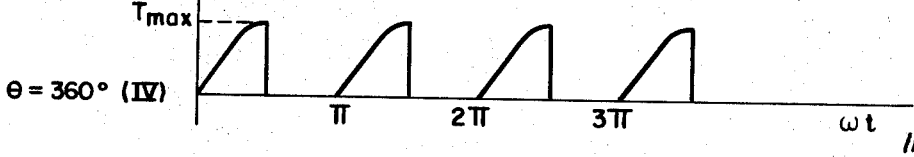

FIG. 3E illustrates the average torque generated when $\theta$ equals 270°; FIG. 3F illustrates the average torque generated when $\theta$ equals 315°; and FIG. 3G illustrates the average torque generated when $\theta$ equals 360°.

It will be appreciated from the torque wave shape patterns illustrated in FIGS. 3A–G that the inventive commutation sequence results in the generating of an average net torque regardless of the orbital position of the satellite. That is, the average net torque is greater than zero regardless of the orbital position of the satellite. Hence, the invention provides a torque producing system regardless of the position of the satellite whereas prior art systems do not provide torque at all satellite positions.

Figure 4:
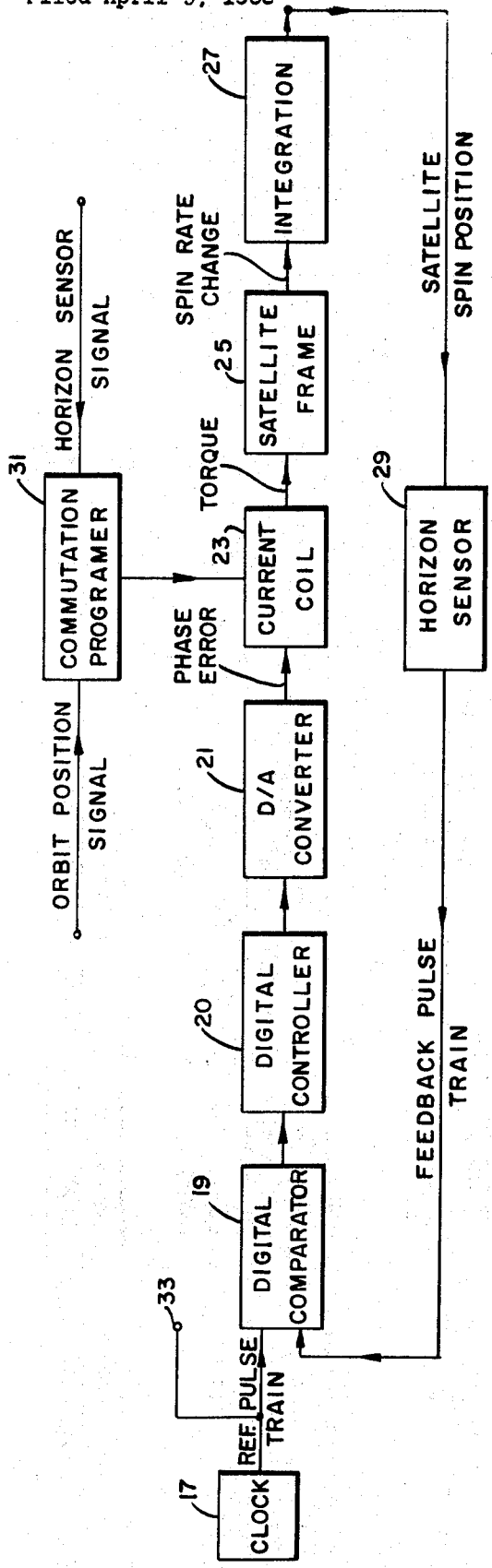
FIG. 4 is a block diagram illustrating the closed loop synchronization system of the invention.

FIG. 4 is a block diagram illustrating an apparatus for carrying out the method of the invention. The apparatus illustrated in FIG. 4 comprises: a clock 17; a digital comparator 19; a digital controller 20; a digital-to-analog convertor 21; a current coil 23; a satellite frame 25; integration due to the satellite rotation 27; a horizon sensor 29; and a commutation programmer 31. The horizon sensor may be an infrared horizon sensor for example, and may be a single sensor or a plurality of sensors as desired. The digital comparator 19 has two inputs, one input is connected to the clock 17 and receives a reference pulse train. The second input is connected to the output of the horizon sensor 29 and receives a feedback pulse train. The output of the digital comparator 19 is connected to the input of the digital controller 20.

The output of the digital controller 20 is connected to the input of the digital-to-analog convertor 21. The digital controller processes the output of the digital comparator so as to obtain stable operation of the feedback control system. The output of the digital-to-analog convertor is connected to the input of the current coil 23. The output of the current coil 23 is a torque force and is applied to the satellite frame 25. The torque, applied to the satellite induces a change in the spin rate of the body due to the interaction between the torque coil's magnetic field and the earth's magnetic field. The rotation of the satellite dynamically integrates the spin rate change such that at any instant, a point on board the satellite is inherently related to the instantaneous phase of the satellite rotation. The horizon sensor 29, fixed to the spacecraft frame, generates output pulses indicative of sensed horizon crossings as the spacecraft spins.

The commutation programmer 31 has two signal inputs. One input receives an orbital position signal and the second input receives a horizon sensor signal. The horizon sensor signal is derived from an infrared horizon sensor, for example. The orbital position signal can be derived from a solar sensor or a steller sensor. Alternatively, a ground station can telemeter orbital position data to the satellite. The output of the commutation programmer 31 is connected to a commutation input of the current coil 23.

In operation, the reference pulse train signal and the feedback pulse train signal are compared in the digital comparator 19. If there is a phase error between these two signals, the controller processed error is applied to the digital-to-analog converor 21. A phase error signal occurs when there is a time difference between the reference pulse train signal and the feedback pulse train signal. That is, if one signal is leading or lagging the other signal an error signal is generated by the digital comparator.

The digital-to-analog converter 21 converts the error signal from digital form to analog form. The polarity of the analog signal is determined by the time relation between the reference signal and the feedback signal. For example, if the feedback signal leads the reference signal, the analog signal may be negative. Then, when the feedback signal lags the reference signal the analog signal is positive. In general, whether the analog signal is positive or negative for a leading or lagging condition is determined by the choice of operational parameters of the overall system.

Figure 5:
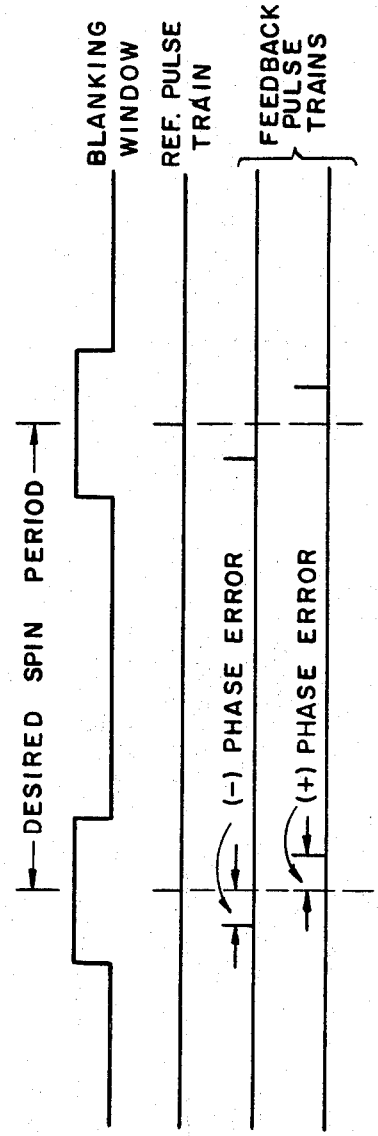
FIG. 5 is a timing diagram illustrating the timing of the synchronization system of the invention.

FIG. 5 is a timing diagram illustrating the timing of the system illustrated in FIG. 4. FIG. 5 illustrates that if the feedback pulse train signal occurs prior in time to the reference pulse train signal a negative error signal is generated by the digital-to-analog convertor. Alternatively, if the reference pulse train signal occurs prior to the sensor or feedback pulse train signal a positive error signal is generated. The error signal is applied to the current coil 23 to increase or decrease the torque applied to the satellite, said torque created because the coil 23 is connected to the frame 25. The spin rate change is integrated by the dynamic rotation of the satellite, shown systematically as 27.

This integration by rotation of the satellite determines the instantaneous spin position with respect to the horizon of the horizon sensor 29, since the sensor is an integral part of satellite. The output of the sensor 29, a function of this instantaneous position, is a pulse, shown in FIG. 5, whenever the sensor notes a crossing of the earth's horizon. Preferably, the reference clock signal controls the opening and closing of an electronic "window" so that the sensor can only generate pulses during predetermined portions of the spin period. That is, because it is only necessary that it be allowed to generate a signal when its sensing surface is about to see the horizon. The phase signal allows this to occur by providing a "window" at the time of horizon crossings. The window is closed at other times to prevent false signals. In addition, the reference clock signal is connected to an output terminal 33 so that it can be utilized by the satellite to control the turning on and the turning off of the satellite's cameras.

The commutation programmer 31 controls the commutation of the current coil in accordance with the steps set forth above. Specifically, the commutation programmer due to its knowledge of orbit position and horizon location (because of its receipt of orbit position signals and horizon sensor signals) can control the application of current to the current coil 23 in the manner herein above described. That is, the commutation programmer controls the phase error signal power application to the current coil in accordance with the following sequence: a quarter spin on; a quarter spin off; commutation; a quarter spin on; and, a quarter spin off. In addition, the commutation programmer determines the reference point in the manner described above. Specifically, the reference point is the local vertical when the satellite is in quadrants II and IV and is a quarter spin after the local vertical when the satellite is in quadrants I and III.

It will be appreciated that the invention as hereinabove described is an uncomplicated method for controlling the spin synchronization of a cartwheel satellite in a polar orbit. All that is required is a system for sensing the spin of the satellite and a means of comparing it with a desired spin rate. Phase error between the desired and the actual spin rate signals is utilized to spin up or spin down the satellite. In addition, the method includes a specific commutation sequence so that control torque is always available regardless of the position of the satellite.

The apparatus of the invention is equally uncomplicated. A horizon sensor determines the spin rate of the satellite. The sensor generates a pulse output when the horizon is sensed which pulse is compared with a reference pulse. The phase error between the two pulses is used to control the application of power to the torquing coil of the cartwheel satellite. And, a commutation programmer controls the application of power in accordance with a desired sequence.

It will be appreciated by those skilled in the art and others that a preferred embodiment of the invention has been described and that numerous changes may be made within the scope of the invention. For example, sensing systems other than horizon sensing systems can be utilized. Other torquing coil commutation schemes that provide available control torque regardless of the position of the satellite can also be utilized. In addition, torquing means other than magnetic torquing means can be utilized in the invention. For example, gas jets located on the exterior of the space vehicle could be operated by the error between the sensed horizon signal and the reference pulse signal to maintain a desired spin rate. Hence, the invention can be practiced otherwise than as specifically described herein.

What is claimed is:

1. A method of spin synchronizing a cartwheel satellite, comprising the steps of:
   sensing the spin rate of the satellite;
   generating a reference spin rate on board the satellite;
   comparing the spin rate signal of the satellite with the reference spin rate signal; and
   commutating a spinning torquing coil in accordance with a predetermined sequence to change the spin rate of the satellite so that the actual spin rate coincides with the reference spin rate.

2. A method as claimed in claim 1 wherein the commutation sequence starting from a predetermined point through a complete cycle includes the following steps:
   applying power for a quarter spin;
   applying no power for a quarter spin;
   commutating the power;
   applying power for a quarter spin; and
   applying no power for the final quarter spin.

3. A method as claimed in claim 2 wherein the point of starting said sequence is the local vertical when the satellite is in quadrants II and IV and is a quarter spin after the local vertical when the satellite is in quadrants I and III.

4. Apparatus for spin synchronizing a cartweel satellite comprising:
   sensing means for sensing the spin rate of the satellite and for generating a signal related to said spin rate;
   reference means for generating a reference signal related to a desired spin rate;
   comparing means for comparing the sensed signal with the reference signal and for generating a phase error signal related to the time difference between said signal;
   torquing means mounted on said satellite for spinning up or spinning down the spin rate of said satellite in accordance with the error signal received from said comparing means; and
   commutation means connected to said torquing means for controlling the application of power to said torquing means.

5. Apparatus as claimed in claim 4 wherein said sensing means comprises a horizon sensor and said reference means comprises a clock pulse generator.

6. Apparatus as claimed in claim 5 wherein said comparison means comprises:
   a digital comparator having one input connected to said clock pulse generator and a second input connected to said horizon sensor;
   a digital controller having its input connected to the output of said digital comparator; and
   a digital-to-analog convertor having its input connected to the output of said digital controller.

7. Apparatus as claimed in claim 6 wherein said torquing means comprises a current coil mounted on said satellite and adapted to receive an error signal input from the output of said digital-to-analog convertor.

8. Apparatus as claimed in claim 7 wherein said commutation means comprises a commutation programmer adapted to receive an orbit position signal and horizon sensor signal and having its output connected to said current coil to control the commutation of error signal from said digital-to-analog converter in a predetermined sequence.

9. Apparatus as claimed in claim 8 wherein said predetermined sequence is:
   power on for a quarter spin;
   power off for a quarter spin;
   commutation of power;
   power on for a quarter spin; and
   power off for the final quarter spin.

References Cited

UNITED STATES PATENTS

| | | | |
|---|---|---|---|
| 3,156,436 | 11/1964 | White | 244—3.21 X |
| 3,278,139 | 10/1966 | Borcher et al. | 244—1 X |
| 3,297,948 | 1/1967 | Kohler | 244—1 X |

MILTON BUCHLER, Primary Examiner

J. L. FORMAN, Assistant Examiner